(12) United States Patent
Li et al.

(10) Patent No.: US 10,302,996 B2
(45) Date of Patent: May 28, 2019

(54) DISPLAY MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lulu Li, Beijing (CN); Guangquan Wang, Beijing (CN); Haiwei Sun, Beijing (CN); Tingting Zhao, Beijing (CN); Zhiyong Chen, Beijing (CN); Enkai Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 42 days.

(21) Appl. No.: 15/529,799

(22) PCT Filed: May 20, 2016

(86) PCT No.: PCT/CN2016/082719
§ 371 (c)(1),
(2) Date: May 25, 2017

(87) PCT Pub. No.: WO2017/133137
PCT Pub. Date: Aug. 10, 2017

(65) Prior Publication Data
US 2018/0046024 A1     Feb. 15, 2018

(30) Foreign Application Priority Data

Feb. 4, 2016   (CN) .......................... 2016 1 0079253

(51) Int. Cl.
*G02F 1/1333*     (2006.01)
*G02F 1/1335*     (2006.01)
(Continued)

(52) U.S. Cl.
CPC ...... *G02F 1/133602* (2013.01); *G02F 1/1343* (2013.01); *G02F 1/13338* (2013.01);
(Continued)

(58) Field of Classification Search
CPC ........... G02F 1/13338; G02F 1/133514; G02F 1/133528; G02F 1/133602; G02F 1/1343;
(Continued)

(56) References Cited

U.S. PATENT DOCUMENTS

2011/0304564 A1* 12/2011 Kim .................. G06F 3/044
                                          345/173
2011/0316803 A1* 12/2011 Kim .................. G06F 3/044
                                          345/173
(Continued)

FOREIGN PATENT DOCUMENTS

CN     104090677 A    10/2014
CN     104375689 A    2/2015
(Continued)

OTHER PUBLICATIONS

ISR and WO dated Nov. 1, 2016; PCT/CN2016/082719.
The First Chinese Office Action dated Nov. 1, 2017; Appln. No. 201610079253.1.

*Primary Examiner* — Hong Zhou
(74) *Attorney, Agent, or Firm* — Ladas & Parry LLP (57) ABSTRACT

A display module and a display device are disclosed. The display module includes a backlight module and a display panel, a FPC bare electrode for conducting static electricity is disposed on the backlight module. The display module further includes an electrically conductive wire and an
(Continued)

electrically conductive component, wherein the electrically conductive wire is disposed between the backlight module and the display panel; the electrically conductive component is disposed between the display panel and the FPC bare electrode and configured for electrically connecting the electrically conductive wire to the FPC bare electrode. The above display module has better ESD performance.

19 Claims, 5 Drawing Sheets (51) Int. Cl.
G02F 1/1343 (2006.01)
G02F 1/1362 (2006.01)
G06F 3/041 (2006.01)
G06F 3/044 (2006.01)

(52) U.S. Cl.
CPC .. *G02F 1/133514* (2013.01); *G02F 1/133528* (2013.01); *G02F 1/136286* (2013.01); *G06F 3/0412* (2013.01); *G06F 3/044* (2013.01)

(58) Field of Classification Search
CPC .. G02F 1/136286; G06F 3/0412; G06F 3/044; G06F 2203/04107
See application file for complete search history.

(56) References Cited

U.S. PATENT DOCUMENTS

| | | | | |
|---|---|---|---|---|
| 2012/0044662 | A1* | 2/2012 | Kim | G06F 3/0418 361/816 |
| 2012/0120011 | A1* | 5/2012 | Teng | G06F 3/0412 345/173 |
| 2013/0329171 | A1* | 12/2013 | Xu | G02F 1/134363 349/106 |
| 2014/0133174 | A1 | 5/2014 | Franklin et al. | |
| 2014/0293144 | A1* | 10/2014 | Bae | G06F 3/041 349/12 |
| 2015/0022741 | A1* | 1/2015 | Nii | G06F 3/0416 349/12 |
| 2015/0049263 | A1 | 2/2015 | Chu et al. | |
| 2015/0316812 | A1* | 11/2015 | Mayumi | G02F 1/133308 349/12 |
| 2016/0103548 | A1* | 4/2016 | Jun | G06F 3/0416 345/173 |
| 2016/0132148 | A1* | 5/2016 | Han | G06F 3/044 345/174 |
| 2016/0291767 | A1* | 10/2016 | Ding | G06F 3/0412 |
| 2017/0055335 | A1 | 2/2017 | Wang et al. | |

FOREIGN PATENT DOCUMENTS

| | | |
|---|---|---|
| CN | 105090831 A | 11/2015 |
| CN | 105093684 A | 11/2015 |
| CN | 105114876 A | 12/2015 |
| JP | 2011-027879 A | 2/2011 |

* cited by examiner

DISPLAY MODULE AND DISPLAY DEVICE

FIELD OF THE ART

Embodiments of the disclosure relate to the field of display technologies, more particularly, to a display module and a display device.

BACKGROUND

A display module comprises a display panel and a backlight module. A touch display module comprises a touch display panel and a backlight module. When the display module or the touch display module has much static electricity, the static electricity may destroy ICs of the touch display module. In the meantime, the static electricity may also break wires surrounding the display panel or the touch display panel, causing irregular display, such as reddish, bluish or irregular display, or even no display.

SUMMARY

In first aspect of the disclosure, it is provided a display module comprising: a backlight module, a display panel, and a flexible printed circuit bare electrode being configured for conducting static electricity and disposed on the backlight module, the display module further comprising an electrically conductive wire and an electrically conductive component, wherein the electrically conductive wire is disposed between the backlight module and the display panel; wherein the electrically conductive component is disposed between the display panel and the flexible printed circuit bare electrode and configured for electrically connecting the electrically conductive wire to the flexible printed circuit bare electrode.

In second aspect of the disclosure, it is provided a display device comprising the above display module.

BRIEF DESCRIPTION OF THE DRAWINGS

In order to clearly illustrate the technical solution of the embodiments of the invention, the drawings of the embodiments will be briefly described in the following; it is obvious that the described drawings are only related to some of embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Thicknesses, sizes and shapes of respective film layers in the drawings do not reflect real proportion of the film layers, and are for illustrative purpose only.

Figure 1:
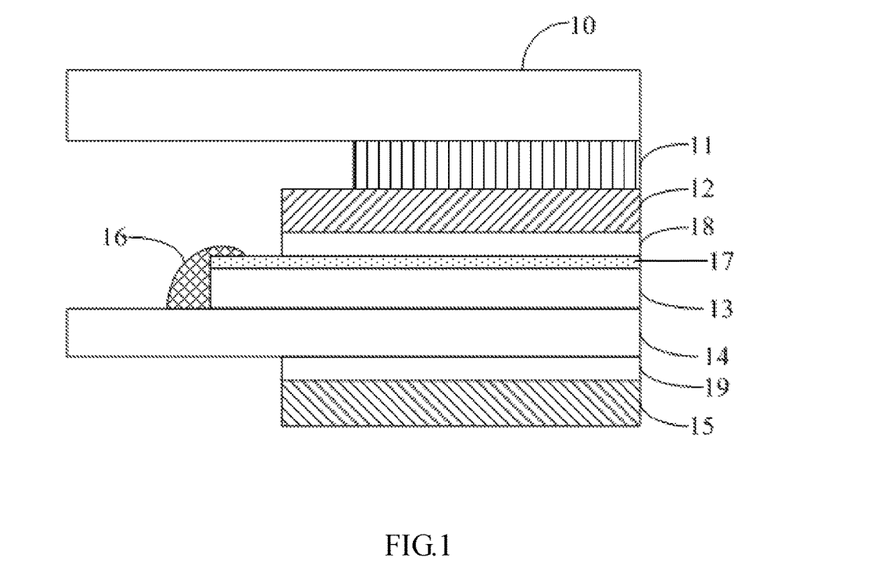
FIG. 1 is a schematic view of an ESD of a display module.

As illustrated in FIG. 1, a display module comprises an array substrate 14 and a color filter substrate 13 disposed as opposed to each other, a front polarizer 12 disposed on a back side of the color filter substrate 13 which is distal to the array substrate 14, a rear polarizer 15 disposed on a back side of the array substrate 14 which is distal to the color filter substrate 13, a protective cover 10 for protecting both the array substrate 14 and the color filter substrate 13, a transparent optical adhesive 11 for bonding the protective cover 10 and the front polarizer 12, a front adhesive 18 for bonding the front polarizer 12 and the color filter substrate 13, and a rear adhesive 19 for bonding the rear polarizer 15 and the array substrate 14. An Electro-Static discharge (ESD) method used by the display module is to provide an ITO film layer 17 or other electrically conductive film layers on a back side of the color filter substrate 13 which is distal to the array substrate, the ITO film layer 17 or other electrically conductive film layers are connected to a ground wire of ICs (not illustrated in the drawing) on the array substrate 14 via silver adhesive 16, thereby realizing ESD.

The above ESD method is not suitable for In-Cell touch display module, because the ITO film layer or other electrically conductive film layers may shield touch signals, causing weak touch signals and touch fault. Currently, only electrically conductive materials having a resistance value within a certain range may avoid shielding the touch signals, but such materials are difficult to obtain during practical fabrication.

Figure 2A:
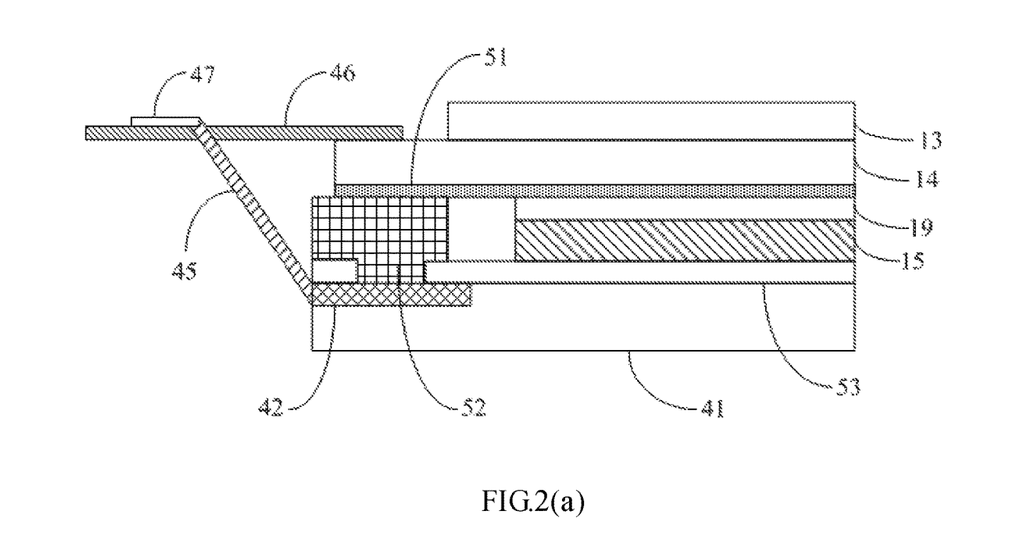
FIG. 2(a) is a side view of a display module in accordance with an embodiment of the invention.
Figure 2B:
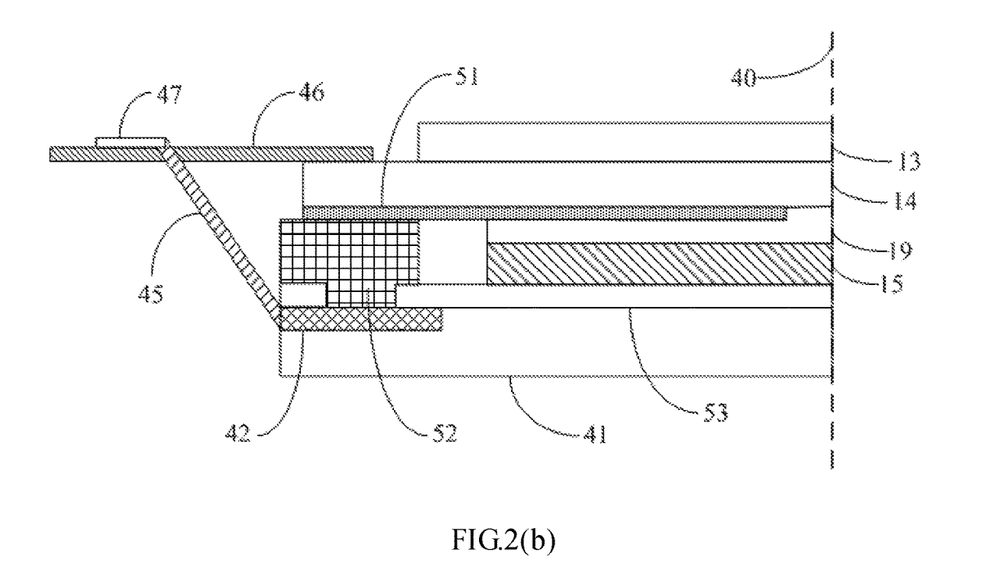
FIGS. 2(b) and 2(c) are cross section views of a display module in accordance with an embodiment of the invention.
Figure 2C:
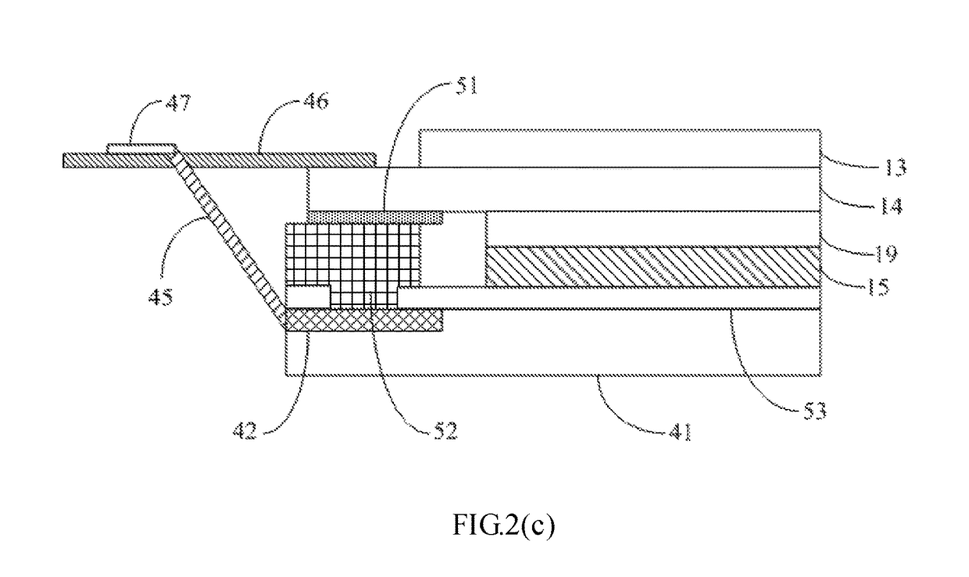

As illustrated in FIGS. 2(a), 2(b) and 2(c), an embodiment of the invention provides a display module, which comprises a backlight module 41 and a display panel. As an example, the display panel comprises an array substrate 14 and a color filter substrate 13 disposed as opposed to each other. The backlight module 41 is provided with a flexible printed circuit (FPC) bare electrode 42 for conducting static electricity. The display module as provided by the embodiment of the invention further comprises an electrically conductive wire 51 and an electrically conductive component 52. The electrically conductive wire 51 is disposed in a predetermined region on a back side of the array substrate 14 which is distal to the color filter substrate 13. The electrically conductive component 52 is disposed between the array substrate 14 and the FPC bare electrode 42, and configured for electrically connecting the electrically conductive wire 51 to the FPC bare electrode 42. FIG. 2(a) is a side view, FIGS. 2(b) and 2(c) are cross section views taken along A-A of FIG. 3. A region on the right side of a dotted line 40 of FIG. 2(b) is a display region of the display module.

The predetermined region of the embodiment of the invention is set according to actual fabrication capacity and user requirements. In at least some of embodiments, the predetermined region of the embodiment of the invention is a non-display region of the array substrate. The display panel of the embodiment of the invention may also be a COA substrate, or a touch display panel, and the like. For the purpose of simplification, a liquid crystal layer between the array substrate and the color filter substrate is not illustrated.

In at least some of embodiments, the display panel further comprises the rear polarizer 15 as well as the adhesive 19 for bonding the array substrate 14 and the rear polarizer 15. As an example, a projection area of the electrically conductive wire 51 on the array substrate 14 has no overlapping area with a projection area of the rear polarizer 15 on the array substrate 14, which is illustrated in FIG. 2(c). In other examples, the projection area of the electrically conductive wire 51 on the array substrate 14 has an overlapping area with a projection area of the rear polarizer 15 on the array substrate 14, which is illustrated in FIG. 2(b). In the case that the electrically conductive wire 51 is made of a metal material (which has high electrical conductivity), for the purpose of not affecting the display of the display module, the projection area of the electrically conductive wire 51 on the array substrate 14 is located in the non-display region of the array substrate.

In at least some of embodiments, an adhesive, such as a black adhesive 53, is disposed between the rear polarizer 15 and the backlight module 41. The black adhesive 53 is disposed in a hollow-out fashion at a position corresponding to the FPC bare electrode 42. For example, the black adhesive 53 has an opening, the electrically conductive component 52 is electrically connected to the FPC bare electrode 42 directly via the opening. The black adhesive used in the embodiment of the invention may be a regular black adhesive 53, or an electrically conductive black adhesive. The regular black adhesive may save fabrication cost.

As illustrated in FIG. 2(a), the FPC bare electrode 42 is connected to a reserved ground electrode 45 on a gold finger of the FPC, and the reserved ground electrode 45 on a gold finger of the FPC is connected to a reserved ground electrode 46 on a gold finger of the display panel, for example, the two ground electrodes 45 and 46 are bonded together via a solder pad 47. By this means, the static electricity generated by the display module of the above embodiment of the invention is discharged through the electrically conductive wire 51, the electrically conductive component 52, the FPC bare electrode 42, the reserved ground electrode 45 on a gold finger of the FPC, and the reserved ground electrode 46 on a gold finger of the display panel, thereby increasing the ESD performance of the product.

In at least some of embodiments, a material of the electrically conductive wire of the embodiment of the invention is a silver adhesive, or a metal material, or a transparent conductive material. When the electrically conductive wire is of a metal material, it is for example Mo/Al/Mo. When the electrically conductive wire is of a transparent conductive material, it is for example Indium tin oxide (ITO) or Indium zinc oxide (IZO), or a composite material made of ITO and IZO. The electrically conductive wire of the embodiment of the invention may also use other electrically conductive materials, which will not be specifically defined here.

In the embodiment of the invention, the electrically conductive wire 51 may be for example formed on the predetermined region on the back side of the array substrate 14 which is distal to the color filter substrate 13 by a method such as printing. It can be contemplated that other method may be used, in actual fabrication processes, to form the electrically conductive wire 51 on the predetermined region on the back side of the array substrate 14 which is distal to the color filter substrate 13. For example, a film coating process or an OGS patterning with yellow light may be used to form the electrically conductive wire 51 on the predetermined region on the back side of the array substrate 14 which is distal to the color filter substrate 13.

Figure 3:
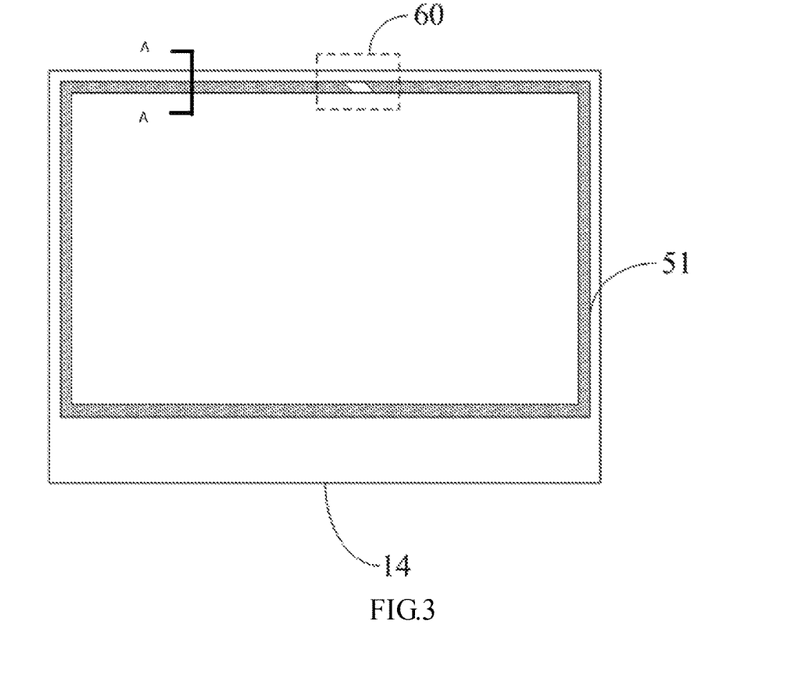
FIG. 3 schematically illustrates a plan view of a display module in accordance with an embodiment of the invention.

In at least some of embodiments, as illustrated in FIG. 3, a shape of the electrically conductive wire 51 is a non-closed loop (in a plane of the display panel), that is, the electrically conductive wire 51 comprises an opening region 60. In a real design, specific locations of the opening region will not be defined in the embodiments of the invention. In comparison with an electrically conductive wire in the shape of a closed loop, designing the shape of the electrically conductive wire as a non-closed loop makes it possible to easily prevent the electrically conductive wire from causing electromagnetic interference to other components in the display module. Moreover, for the purpose of not affecting the discharge of the static electricity, a width of the opening region 60 (along a horizontal direction of FIG. 3) may not be too large, which may be decided based on conditions of real fabrication processes. In at least some of embodiments, to better conduct the static electricity, edges of the loop are configured as sawtooth-shaped. It can be contemplated that the pattern of the electrically conductive wire 51 may be of other shapes in other embodiments, as long as the configuration of the electrically conductive wire can ensure that the static electricity generated by the display module is discharged through the electrically conductive wire, the electrically conductive component, the FPC bare electrode, the reserved ground electrode on the gold finger of the FPC and the reserved ground electrode on the gold finger of the display panel.

In at least some of embodiments, the electrically conductive component 52 is an electrically conductive sponge, or an electrically conductive cloth, or a graphene sheet. Taking the electrically conductive cloth as an example, in actual uses, an electrically conductive cloth with an electrically conductive tape is chosen. As an example, to better connect the electrically conductive cloth and the electrically conductive wire, an electrically conductive adhesive with good attachment and conductivity performance is used to bond the electrically conductive cloth and the electrically conductive wire. In other embodiments, the conductive component may be in other forms. The detailed material and shape of the electrically conductive component will not be defined here.

Figure 4:
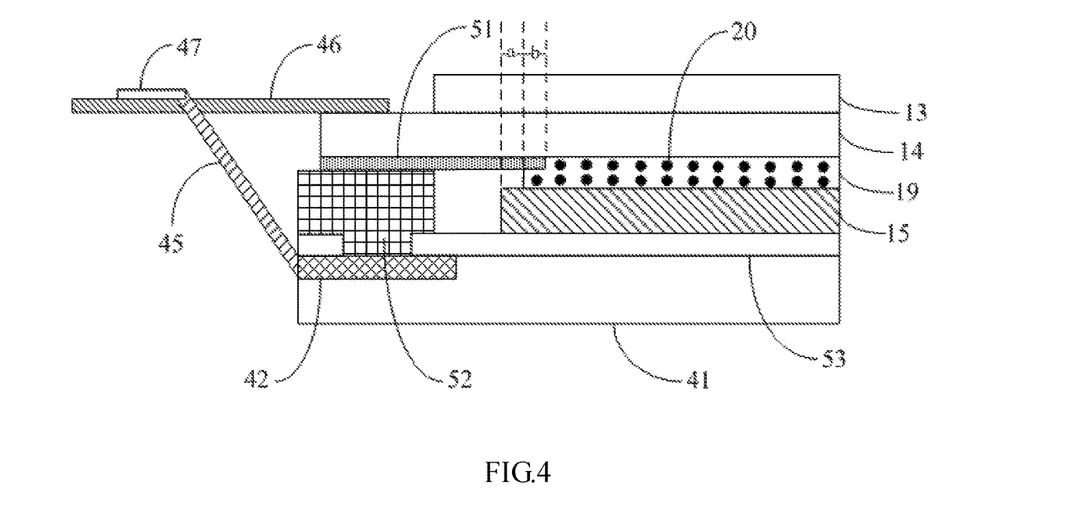
FIG. 4 schematically illustrates a cross section view of another display module in accordance with an embodiment of the invention.

An embodiment of the invention further provides a display module. As illustrated in FIG. 4, the display module is different from the display module of FIG. 2(b) in that the adhesive 19 includes several electrically conductive particles 20. The adhesive 19 may shrink under the influence of external environment, a shrinking distance is as illustrated in the drawing. The drawing only illustrates the shrinking of the adhesive 19 under the influence of the external environment, however, in practical implementation, the rear polarizer 15 may further shrink to a certain extent under the influence of the external environment. As the shrinking of the rear polarizer 15 is not considered here, the shrinking of the rear polarizer under the influence of the external environment is not illustrated in the drawing. In this case, an orthogonal projection of the adhesive 19 after shrinking on the array substrate 14 has an overlapping region with an orthogonal projection of the electrically conductive wire 51 on the array substrate 14.

As a result, the static electricity generated by the display module of the embodiment of the invention is discharged via the electrically conductive adhesive 19, the electrically conductive wire 51, the electrically conductive component 52, the FPC bare electrode 42, the reserved ground electrode 45 on a gold finger of the FPC, and the reserved ground electrode 46 on the gold finger of the display panel. In this case, even after the adhesive shrinks under the external influence, it can still well discharge the generated static electricity, thereby increasing the ESD performance of the product.

Figure 5:
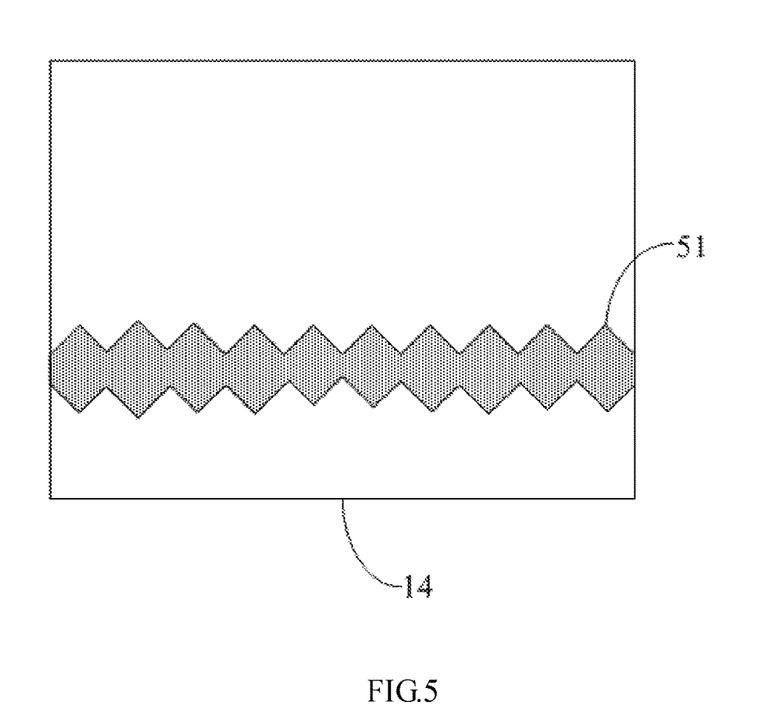
FIG. 5 schematically illustrates a plan view of another display module in accordance with an embodiment of the invention.

In at least some of embodiments, while the generated static electricity is discharged in a manner illustrated in FIG. 4, the electrically conductive wire 51 may also have a shape of a strip (in the plane of the display panel) as illustrated in FIG. 5, in addition to the pattern of the non-closed loop. In an actual design, to better conduct the static electricity, edges of the strip is configured as sawtooth-shaped. It can be contemplated that the pattern of the electrically conductive wire 51 may be of other shapes in other embodiments, as long as the configuration of the electrically conductive wire can ensure that the static electricity generated by the display module is discharged through the electrically conductive wire, the electrically conductive component, the FPC bare electrode, the reserved ground electrode on the gold finger of the FPC and the reserved ground electrode on the gold finger of the display panel.

Figure 6A:
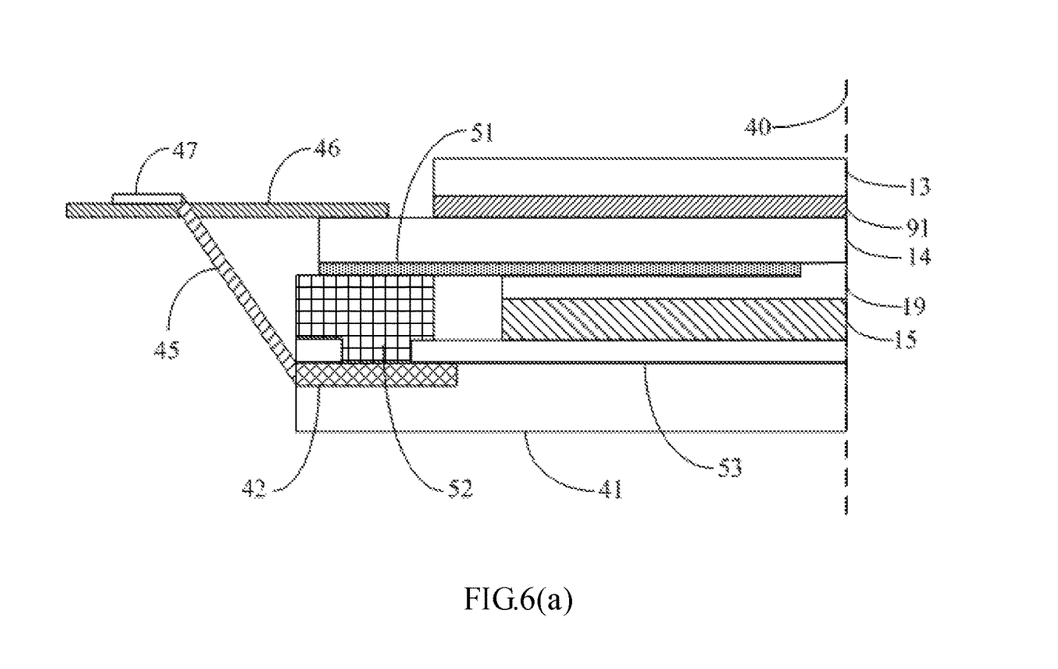
FIGS. 6(a) and 6(b) schematically illustrate cross section views of a touch display module in accordance with an embodiment of the invention.
Figure 6B:
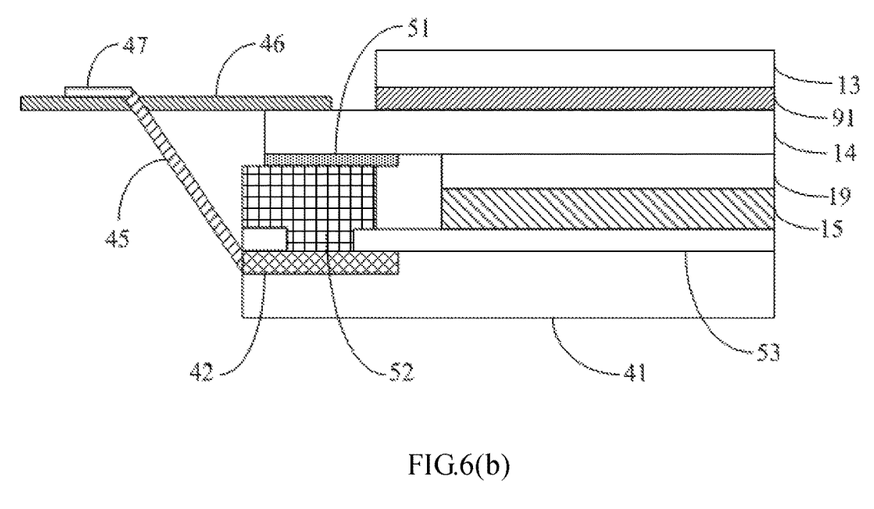

As illustrated in FIGS. 6(a) and 6(b), an embodiment of the invention further provides a touch display module having a touch function, the touch display module comprises a backlight module 41, an array substrate 14 and a color filter substrate 13 disposed as opposed to each other, a touch electrode 91 disposed between the array substrate 14 and the color filter substrate 13, the backlight module 41 is provided with a FPC bare electrode 42 for conducting static electricity. The touch display module of the embodiment of the invention further comprises an electrically conductive wire 51 and an electrically-conductive component 52. The electrically conductive wire 51 is disposed in a predetermined region on a back side of the array substrate 14 which is distal to the color filter substrate 13. The electrically conductive component 52 is disposed between the array substrate 14 and the FPCB bare electrode 42, and configured for electrically connecting the electrically conductive wire 51 to the FPCB bare electrode 42. FIGS. 6(a) and 6(b) herein are cross section views.

In the embodiment of the invention, the black adhesive used by the touch display module is a regular black adhesive 53, without the need for an electrically conductive black adhesive, saving the fabrication cost of black adhesives. Moreover, in order to electrically connect the electrically conductive component 52 and the FPC bare electrode 42, the black adhesive 53 is disposed in a hollow-out fashion at a position corresponding to the FPC bare electrode 42, that is, the black adhesive 53 has an opening.

The static electricity generated by the touch display module of the embodiment of the invention is discharged via the electrically conductive wire 51, the electrically conductive component 52, the FPC bare electrode 42, the reserved ground electrode 45 on a gold finger of the FPC, and the reserved ground electrode 46 on the gold finger of the display panel, thereby increasing the ESD performance of the product.

In at least some of embodiments, the touch electrode 91 is a self-capacitive touch electrode, or a mutual-capacitive touch electrode. When the touch electrode is a self-capacitive touch electrode, it may be disposed on a side of the color filter substrate facing the array substrate, or on a back side of the color filter substrate distal to the array substrate.

When the touch electrode is a mutual-capacitive touch electrode, both a drive electrode and a sense electrode may be disposed on a side of the array substrate facing the color filter substrate. Alternatively, the drive electrode and the sense electrode may be disposed on a side of the color filter substrate facing the array substrate. It may also dispose the drive electrode on a side of the array substrate facing the color filter substrate, and dispose the sense electrode on a side of the color filter substrate facing the array substrate.

Figure 7:
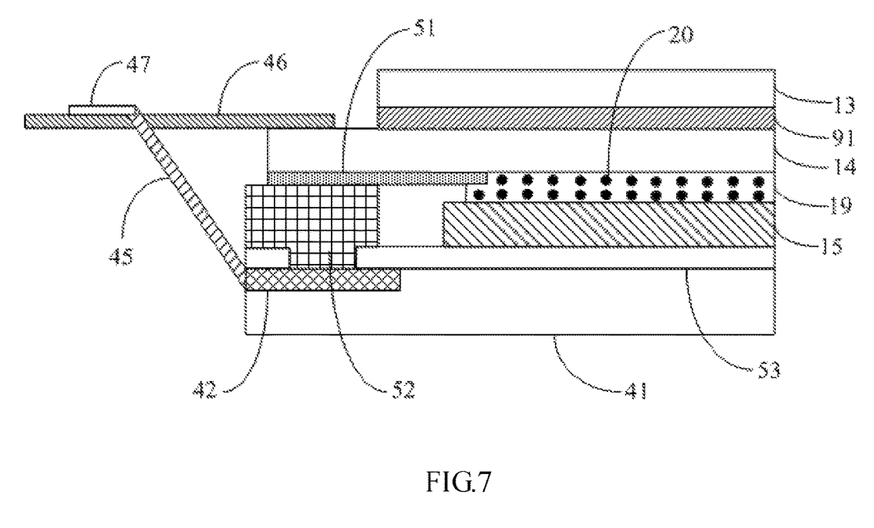
FIG. 7 schematically illustrates a cross section view of another touch display module in accordance with an embodiment of the invention.

In at least some of embodiments, the touch display module of the embodiment of the invention discharge the static electricity in another way. As illustrated in FIG. 7, the touch display module of the embodiment comprises a rear polarizer 15 on a back side of the array substrate 14 distal to the color filter substrate 13, and an adhesive 19 for bonding the rear polarizer 15 and the array substrate 14. The adhesive 19 includes several electrically conductive particles 20. When the adhesive 19 shrinks under the influence of external environment, an orthogonal projection of the adhesive 19 on the array substrate 14 has an overlapping region with an orthogonal projection of the electrically conductive wire 51 on the array substrate 14.

As a result, the static electricity generated by the touch display module of the embodiment of the invention is discharged via the electrically conductive adhesive 19, the electrically conductive wire 51, the electrically conductive component 52, the FPC bare electrode 42, the reserved ground electrode 45 on a gold finger of the FPC, and the reserved ground electrode 46 on the gold finger of the display panel. In this case, even after the adhesive 19 shrinks under the external influence, it can still well discharge the generated static electricity, increasing the ESD performance of the product.

An embodiment of the invention further provides a display device. The display device comprises the above display module. The display device may be a LCD panel, a LCD monitor, a liquid crystal television, an Organic Light Emitting Diode (OLED) panel, an OLED monitor, an OLED television, an e-paper or any display device having a display component or function.

The embodiments of the invention use the electrically conductive wire and the electrically conductive component to form the ESD path, thereby reducing the fabrication cost while ensuring good EDS performance of the display module. Therefore, the embodiments of the invention improve the EDS performance of products without increasing the fabrication cost.

What is described above is related to the illustrative embodiments of the disclosure only and not limitative to the scope of the disclosure; the scopes of the disclosure are defined by the accompanying claims.

The present application claims priority from Chinese Application No. 201610079253.1, filed on Feb. 4, 2016, the disclosure of which is incorporated herein by reference in its entirety.

What is claimed is:

1. A display module comprising:
a display panel comprising a polarizer,
a backlight module,
a flexible printed circuit bare electrode, disposed on the backlight module and configured for conducting static electricity,
an electrically conductive wire, disposed between the backlight module and the display panel,
an electrically conductive component, disposed between the display panel and the flexible printed circuit bare electrode and configured for electrically connecting the electrically conductive wire to the flexible printed circuit bare electrode, and
an adhesive layer having an opening, the adhesive layer being interposed between the polarizer and the backlight module, the electrically conductive component being electrically connected to the flexible printed circuit bare electrode directly via the opening.

2. The display module of claim 1, wherein the display panel further comprises an array substrate and a color filter substrate disposed as opposed to each other.

3. The display module of claim 2, wherein the electrically conductive wire is disposed on a back side of the array substrate which is distal to the color filter substrate.

4. The display module of claim 2, wherein the electrically conductive wire is disposed on a non-display region of the array substrate.

5. The display module of claim 2, wherein the display panel further comprises an adhesive configured for bonding the array substrate and the polarizer, wherein electrically conductive particles are disposed in the adhesive.

6. The display module of claim 5, wherein after the adhesive shrinks, an orthogonal projection of the adhesive on the array substrate overlaps with an orthogonal projection of the electrically conductive wire on the array substrate.

7. The display module of claim 2, wherein the display module is a touch display module, the touch display module comprises a touch electrode disposed between the array substrate and the color filter substrate.

8. The display module of claim 2, wherein the polarizer is disposed on a back side of the array substrate which is distal to the color filter substrate, and the electrically conductive wire is interposed between the array substrate and the polarizer.

9. The display module of claim 1, wherein a shape of the electrically conductive wire is a non-closed loop.

10. The display module of claim 9, wherein the non-closedloop has saw-tooth shaped edges.

11. The display module of claim 1, wherein a shape of the electrically conductive wire is a strip.

12. The display module of claim 11, wherein the strip has saw-tooth shaped edges.

13. The display module of claim 1, wherein the electrically conductive wire is silver adhesive.

14. The display module of claim 1, wherein the electrically conductive wire is made of metal.

15. The display module of claim 14, wherein the metal is Mo/Al/Mo.

16. The display module of claim 1, wherein the electrically conductive wire is made of transparent electrically conductive material.

17. The display module of claim 16, wherein the transparent electrically conductive material is ITO, or IZO, or a composite material of ITO and IZO.

18. The display module of claim 1, wherein the electrically conductive component is electrically conductive foam, or electrically conductive cloth, or graphene sheet.

19. A display device comprising the display module of claim 1.

* * * * *